J. W. GROVER.
Machines for Making Spring Washers.
No. 169,260. Patented Oct. 26, 1875.

2 Sheets--Sheet 1.

J. W. GROVER.
Machines for Making Spring Washers.
No. 169,260. Patented Oct. 26, 1875.
2 Sheets--Sheet 2.
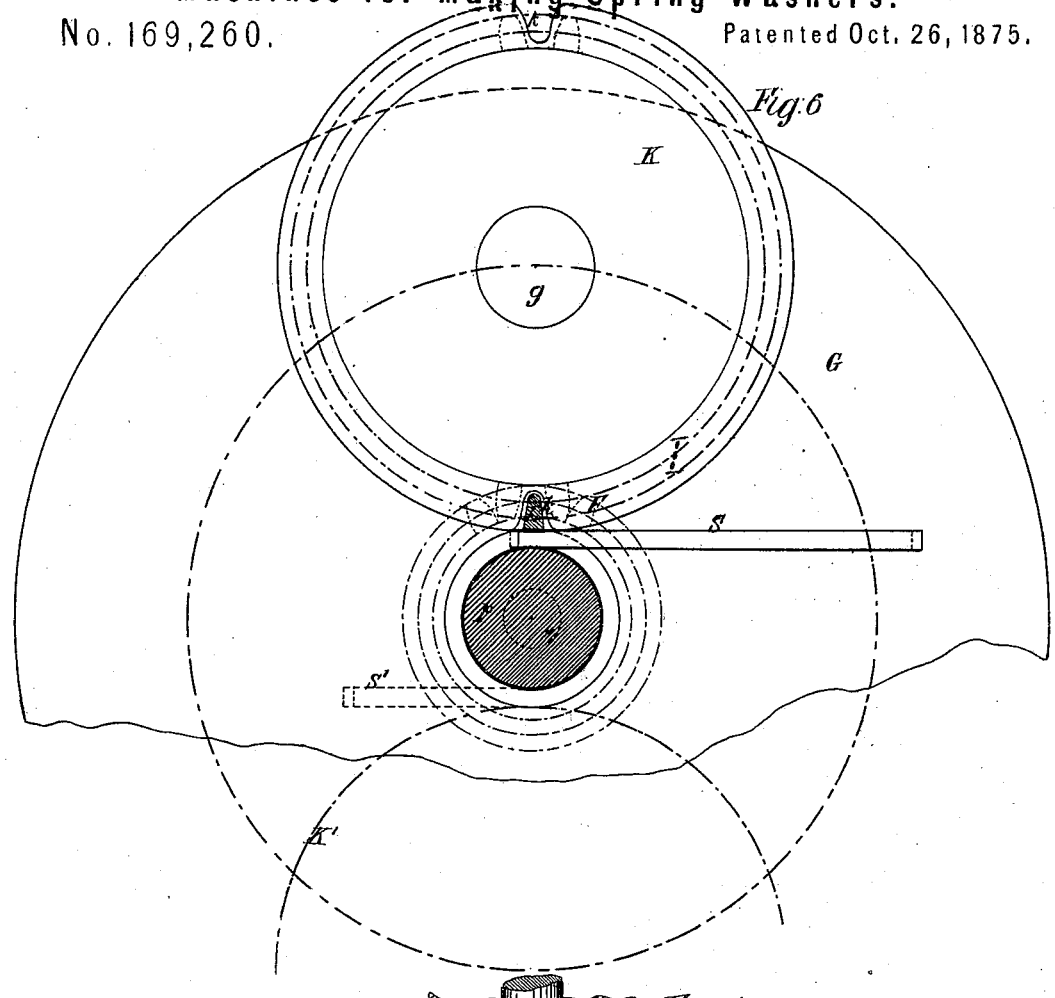
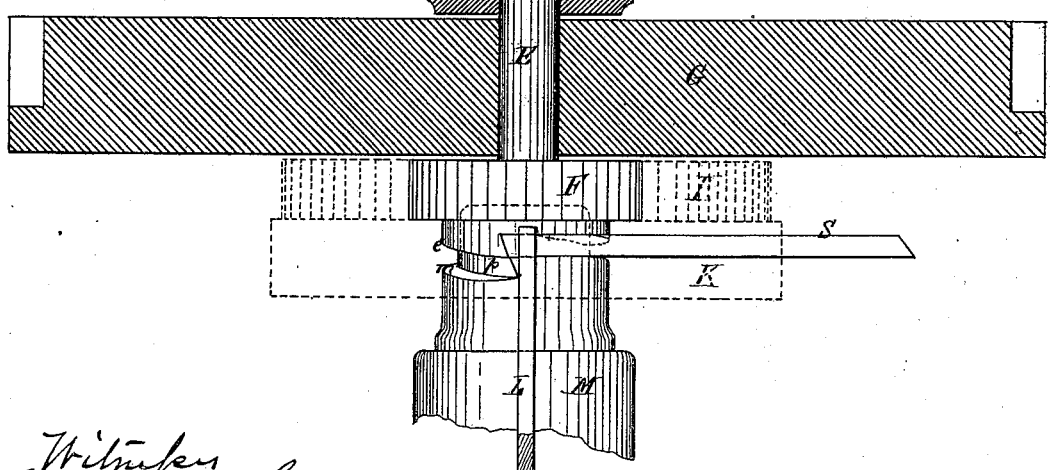

UNITED STATES PATENT OFFICE.

JOHN WILLIAM GROVER, OF WESTMINSTER, ENGLAND.

IMPROVEMENT IN MACHINES FOR MAKING SPRING-WASHERS.

Specification forming part of Letters Patent No. 169,260, dated October 26, 1875; application filed September 7, 1875.

*To all whom it may concern:*

Be it known that I, JOHN WILLIAM GROVER, of No. 9 Victoria Chambers, Westminster, in the county of Middlesex, England, civil engineer, have invented an Improvement in Apparatus for Manufacturing Spring-Washers; and do hereby declare that the following description, taken in connection with the accompanying sheets of drawings hereinafter referred to, forms a full and exact specification of the same, wherein I have set forth the nature and principles of my said improvements, by which my invention may be distinguished from others of a similar class, together with such parts as I claim and desire to secure by Letters Patent—that is to say:

My invention relates to the manufacture of a kind of spring-washer, which, being inserted under a nut, has the effect of locking it, or preventing the nut from slacking back and unscrewing itself, even when it is subjected to vibration—as, for example, on the fish-plates of rails.

I will describe the said washer and the apparatus employed in manufacturing it, with reference to the accompanying drawings, of which—

Figure 1:
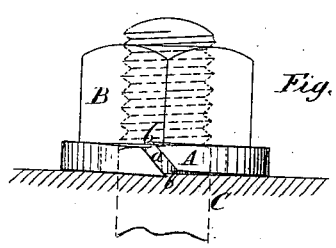
Figure 2:
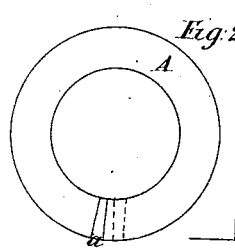
Figure 4:
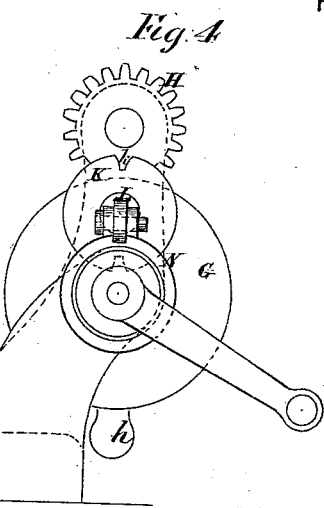
Figure 3:
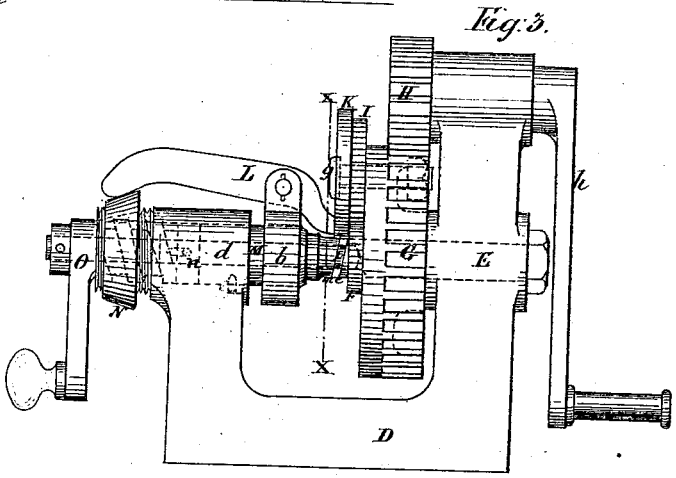
Figure 5:
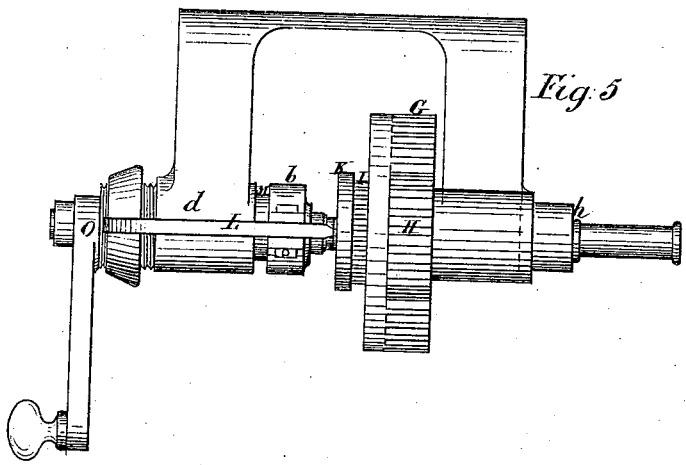

Figure 1 represents an edge view of the washer placed under a nut, and Fig. 2 is a plan of the washer. Fig. 3 is a side view; Fig. 4, an end view; and Fig. 5, a plan of the apparatus by which the washer is manufactured; and Figs. 6 and 7 show, respectively, a part enlarged cross-section on line X X, Fig. 3, and a part enlarged plan.

On reference to Figs. 1 and 2 it will be seen that the washer A consists of a piece of steel bar bent round, so as to form a ring split obliquely at one part $a$ of its periphery, the ring so formed being slightly helical, or form a screw-thread of a hand opposite to that of the screw of the bolt and nut, to which it is applied. The edges of the oblique, cut at $b\ b$, are by preference turned slightly up from the general surface of the washer, so that when the nut B tends to unscrew itself, these edges inserting themselves like chisels in the face of the nut B and of the bed C, on which the washer is pressed by the nut, act like pawls on a ratchet to prevent the nut from turning in the direction of unscrewing, while the obliquity of the edges, combined with the elasticity of the washer, permits the nut to be screwed tightly up in the opposite direction.

The apparatus for manufacturing the before-described spring-washers consists of a framing, D, in one side of which is fixed a shaft, E, a pinion, F, being fixed on the said shaft, and a wheel, G, being mounted, so that it can revolve freely thereon when driven by a pinion, H, worked by a winch, $h$, or otherwise. In the wheel G is fixed a stud-pin, $g$, on which is mounted a wheel, I, gearing with the fixed pinion F, the gearing of F and I having the definite proportion of two to one, so that as the wheel G makes one revolution the wheel I makes half a revolution round its axis. On the wheel I is fixed a disk, K, having two notches, $k\ k$, in its periphery to take the end of a lever, L, which is mounted on a collar, $b$, fixed on a mandrel, M, that can slide within a boss, $d$, of the framing, being prevented from turning and having its to and fro travel limited by a pin, $n$, working in a slotted hole in the boss $d$. On the projecting end of the boss $d$ is placed a cone, N, which can be adjusted in its position by screwing it more or less on the end of the boss. A screw and handle, O, like that employed for a lathe center, serves to move the mandrel M to and fro in the boss $d$. The face of the mandrel M, at $m$, and the face of the shaft E, at $e$, are formed to the desired helical obliquity of the washer to be manufactured, the exterior diameter of which corresponds with $m$, and its interior with a stud, $p$, projecting from $m$ and entering a hole in $e$.

In operating with this apparatus the mandrel M is retracted by turning the handle and screw O, and the disk K is brought to the position shown in Figs. 4 and 6, with one of its notches $k$ facing the end of the lever L. A piece of straight steel rod, cut to a length equal to the circumference of the washer to be produced, with its ends beveled to the desired obliquity of the cut in the washer, as shown at S, Figs. 6 and 7, is heated to redness, and its end is inserted between the faces $m$ and $e$, and under the nose of the lever L. The mandrel M is then advanced, so as to squeeze the end of the steel rod between it and the face $e$, as shown at Fig. 7, and at the same time the outer end of the lever L, being made by the advance of the mandrel to slide along the cone N, is pressed upward, whereby its nose is pressed downward so as to squeeze the end of the steel rod between it and the stud $p$. The end of the rod being thus held, as in a vise, the winch $h$ is turned until the wheel G makes a complete revolution in the direction of the arrow, Fig. 6, carrying round with it the disk K, which bends the steel rod round the stud $p$, and presses it into the helical space between $m$ and $e$, as indicated by the dotted lines K' and S', Fig. 6. The complete revolution of the wheel G and disk K having been effected the mandrel M is retracted, releasing the lever L and the washer formed between $m$ and $e$, which thereupon drop out, and can be hardened and tempered.

Having thus described the nature of my invention, and the best means I know of carrying it out in practice, I claim—

In apparatus for manufacturing the spring-washers A, the combination of the two helical faces $m$ and $e$, the sliding mandrel M and its lever L acted on by the adjustable cone N, with the revolving disk K, whereby a piece of straight steel rod is clamped and bent into the form of the spring-washer, substantially as herein described.

In testimony whereof I have signed my name to this specification in the presence of two subscribing witnesses this 27th day of July, 1875.

JOHN WILLIAM GROVER.

Witnesses:
 CHAS. D. ABEL,
 JNO. P. M. MILLARD.